United States Patent
Hoeger et al.

(10) Patent No.: US 8,992,172 B2
(45) Date of Patent: Mar. 31, 2015

(54) TURBO ENGINE

(75) Inventors: Martin Hoeger, Erding (DE); Franz Malzacher, Gröbenzell (DE); Marc Nagel, Wolfratshausen (DE)

(73) Assignee: MTU Aero Engines GmbH, Munich (DE)

( * ) Notice: Subject to any disclaimer, the term of this patent is extended or adjusted under 35 U.S.C. 154(b) by 960 days.

(21) Appl. No.: 13/131,040

(22) PCT Filed: Dec. 2, 2009

(86) PCT No.: PCT/DE2009/001699
§ 371 (c)(1),
(2), (4) Date: May 25, 2011

(87) PCT Pub. No.: WO2010/063271
PCT Pub. Date: Jun. 10, 2010

(65) Prior Publication Data
US 2011/0225979 A1 Sep. 22, 2011

(30) Foreign Application Priority Data
Dec. 6, 2008 (DE) .................. 10 2008 060 847

(51) Int. Cl.
F01D 9/00 (2006.01)
F01D 5/14 (2006.01)
F01D 9/04 (2006.01)

(52) U.S. Cl.
CPC ...... *F01D 5/143* (2013.01); *F01D 9/04* (2013.01); *Y02T 50/673* (2013.01); *F05D 2240/301* (2013.01); *F05D 2250/70* (2013.01)
USPC ............................................. 415/192

(58) Field of Classification Search
CPC ........... F01D 5/141; F01D 5/143; F01D 9/04; F01D 9/042; F05D 2240/301; F05D 2250/70; Y02T 50/673
USPC ............ 415/142, 182.1, 208.1, 208.2, 208.4, 415/208.5, 191, 192, 200, 209.4
See application file for complete search history.

(56) References Cited

U.S. PATENT DOCUMENTS 5,342,170 A * 8/1994 Elvekjaer et al. ............. 415/192
5,947,683 A * 9/1999 Kobayashi ................. 415/208.1
(Continued)

FOREIGN PATENT DOCUMENTS

DE 1911484 A1 9/1969
DE 3530769 A1 3/1986
(Continued)

*Primary Examiner* — Nathaniel Wiehe
*Assistant Examiner* — Eldon Brockman
(74) *Attorney, Agent, or Firm* — Barlow, Josephs & Holmes, Ltd.

(57) ABSTRACT

A turbo engine, particularly a gas turbine aircraft engine, has compressor components, turbine components, and at least one combustion chamber. At least one support rib is in flow channel between two turbine components, connected one behind the other. Each support rib diverts a flow through the flow channel. A preferably cylindrical guide element runs within each support rib. Each support rib has a suction side with a greater thickness toward a radially inner flow channel wall as well as toward a radially outer flow channel wall, when viewed in the radial direction. Each support rib has a pressure side with a greater thickness toward a radially inner flow channel wall as well as toward a radially outer flow channel wall, when viewed in the radial direction. The front edge and the rear edge of each support rib are inclined in the meridian direction.

9 Claims, 5 Drawing Sheets

(56) References Cited

U.S. PATENT DOCUMENTS

| | | | | |
|---|---|---|---|---|
| 6,036,438 | A * | 3/2000 | Imai | 415/192 |
| 6,312,219 | B1 * | 11/2001 | Wood et al. | 415/191 |
| 6,398,485 | B1 * | 6/2002 | Frosini et al. | 415/115 |
| 6,503,054 | B1 * | 1/2003 | Bielek et al. | 415/191 |
| 6,508,630 | B2 * | 1/2003 | Liu et al. | 416/228 |
| 7,011,495 | B2 * | 3/2006 | Guemmer | 415/199.5 |
| 7,686,567 | B2 * | 3/2010 | Grover et al. | 415/1 |
| 2002/0197156 | A1 * | 12/2002 | Haller | 415/192 |
| 2006/0165520 | A1 * | 7/2006 | Guemmer | 415/191 |
| 2010/0040462 | A1 * | 2/2010 | Praisner et al. | 415/208.1 |

FOREIGN PATENT DOCUMENTS

| | | |
|---|---|---|
| DE | 60313979 T2 | 3/2008 |
| EP | 0798447 A2 | 10/1997 |
| EP | 1632648 A2 | 3/2006 |
| EP | 1731734 A2 | 12/2006 |
| EP | 1534934 B1 | 5/2007 |
| GB | 2129882 A | 5/1984 |

\* cited by examiner

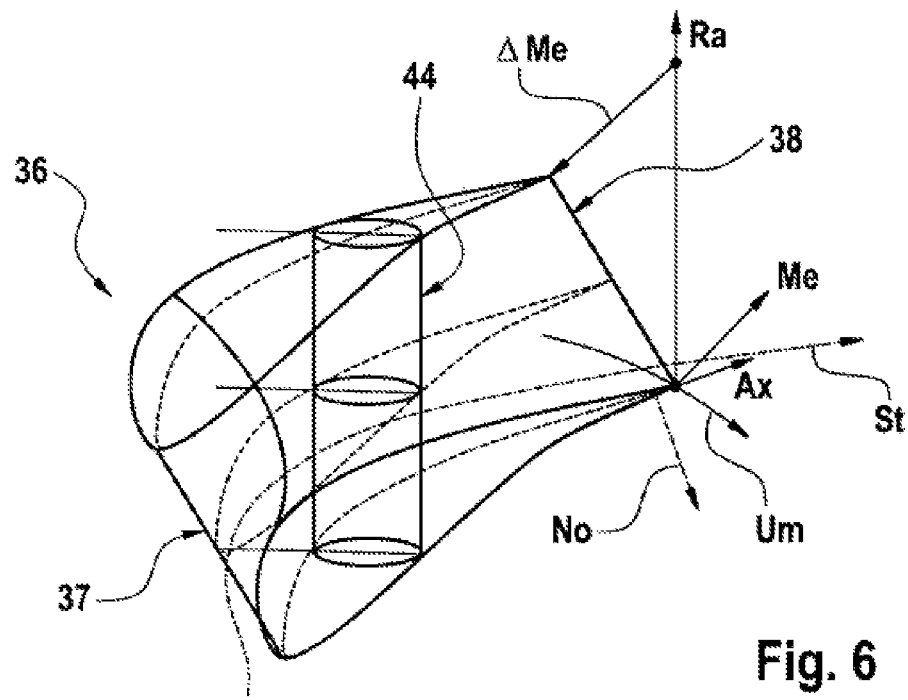
Fig. 6
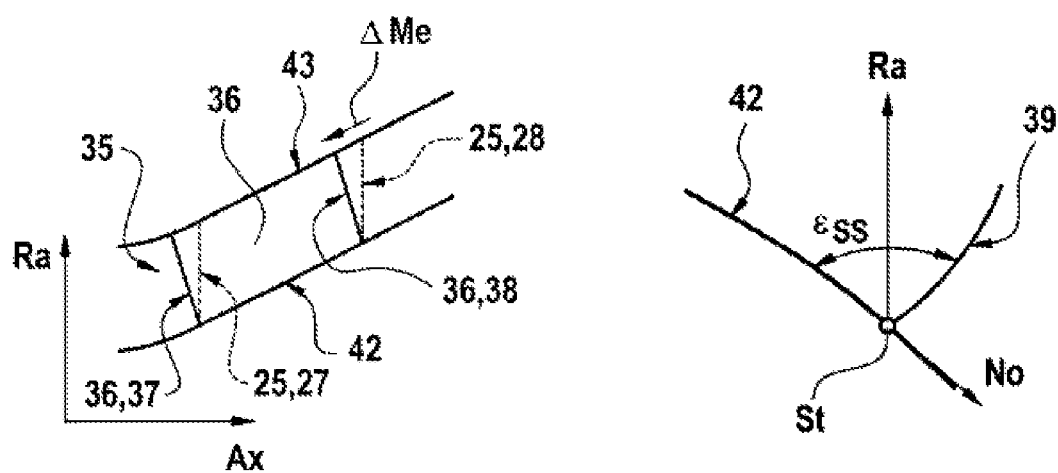
Fig. 7
Fig. 8

TURBO ENGINE

The invention relates to a turbo engine, in particular a gas turbine aircraft engine, according to the preamble of claim 1.

A multi-shaft gas turbine aircraft engine provides a plurality of compressor components, at least one combustion chamber and a plurality of turbine components. Thus, a two-shaft gas turbine aircraft engine provides a low-pressure compressor, a high-pressure compressor, at least one combustion chamber, a high-pressure turbine as well as a low-pressure turbine. A three-shaft gas turbine aircraft engine provides a low-pressure compressor, an intermediate-pressure compressor, a high-pressure compressor, at least one combustion chamber, a high-pressure turbine, an intermediate-pressure turbine and a low-pressure turbine.

FIG. 1 shows a very schematized excerpt taken from a multi-shaft gas turbine aircraft engine known from the prior art in the region of a rotor 20 of a high-pressure turbine 21 as well as a rotor 22 of a low-pressure turbine 23. A flow channel 24 extends between high-pressure turbine 21 and low-pressure turbine 23, in order to introduce the flow that leaves high-pressure turbine 21 into low-pressure turbine 23, at least one support rib 25 being positioned in flow channel 24. Support rib 25 involves a stator-side component, which diverts the flow that flows through flow channel 24. Such a flow-diverting support rib 25 provides a front edge 27, which is also called a flow inlet edge, a rear edge 28, which is also called a flow outlet edge, a suction side as well as a pressure side. Support rib 25 diverting the flow on the suction side is illustrated in FIG. 1 by arrows 26. Such a support rib 25 is typically designed as a hollow rib, wherein a preferably cylindrical guide element typically runs in the radial direction in an inside space or hollow space of support rib 25, in order to guide, e.g., supply lines from radially inside to radially outside, or vice versa, from radially outside to radially inside. In addition, on the right side of FIG. 1, a section through support rib 25 is shown along the intersecting line A-A, wherein it can be derived from FIG. 1 that in the case of turbo engines known from the prior art, such a support rib 25 in the region of suction side 29 as well as in the region of pressure side 30 is contoured in such a way that this rib has an approximately unchanged thickness, viewed in the radial direction.

In the case of the turbo engine shown in the excerpt in FIG. 1 and known from the prior art, strong three-dimensional flow effects (see arrows 26), which can lead to considerable flow losses, occur in the region of support rib 25. There is the need for a turbo engine in which a more balanced flow and smaller flow losses occur.

Proceeding from this, the problem of the present invention is based on creating a novel turbo engine, in particular a gas turbine aircraft engine, with smaller flow losses.

This problem is solved by a turbo engine according to claim 1. According to the invention, the turbo engine comprises at least the following features: a) the suction side of the support rib or of each support rib is contoured in such a way that, viewed in the radial direction, a thickness of the respective support rib is enlarged or increases in the direction onto a radially inner boundary wall of the flow channel, as well as onto a radially outer boundary wall of the flow channel; b) the pressure side of the support rib or of each support rib is contoured in such a way that, viewed in the radial direction, the thickness of the respective support rib is enlarged or increases at least directly in the region of the radially inner boundary wall of the flow channel as well as directly in the region of the radially outer boundary wall of the flow channel; c) the front edge and the rear edge of the support rib or of each support rib are inclined in the meridian direction.

In the case of the turbo engine according to the invention, due to the special design of the flow-diverting support rib or of each support rib, which is positioned in a flow channel between two turbines, flow losses can be considerably reduced, i.e., on an order of magnitude between 20% and 40%.

Preferred enhancements of the invention are taken from the subclaims and the following description. Embodiment examples of the invention will be explained in more detail based on the drawing, but are not limited thereto. Here:

BRIEF DESCRIPTION OF THE DRAWINGS

FIG. 6 shows a third intermediate design stage of a support rib for further clarification of the invention;

FIG. 7 shows a detail for the third intermediate design stage of FIG. 6;

FIG. 8 shows another detail for the third intermediate design stage of FIG. 6;

DETAILED DESCRIPTION OF THE INVENTION

Figure 2:
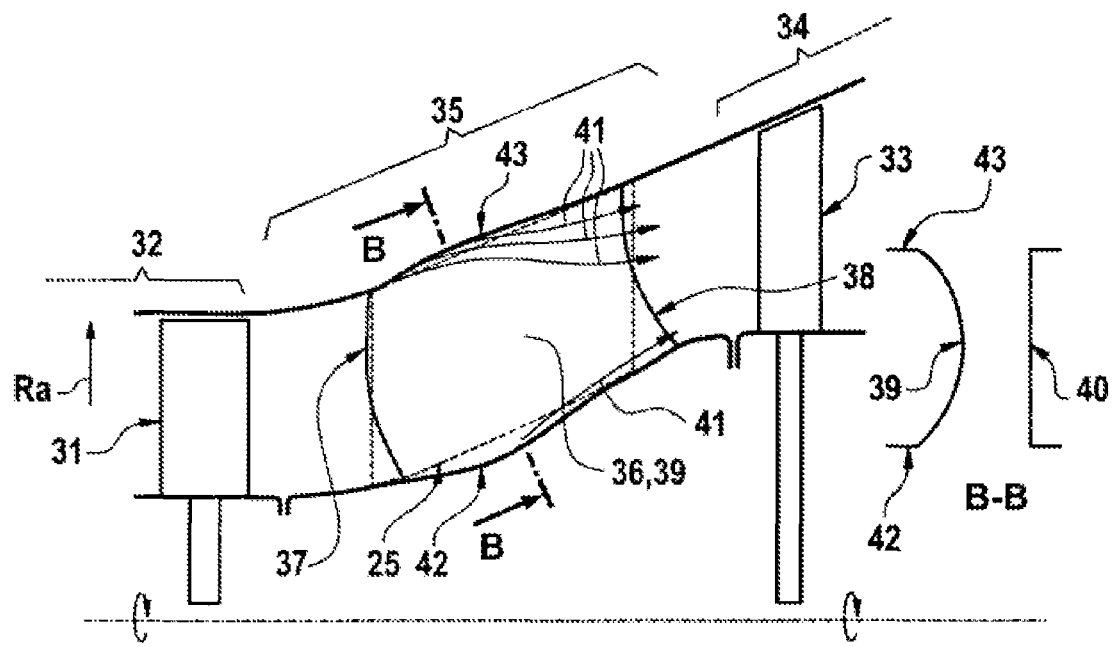
FIG. 2 shows a very schematic, excerpted longitudinal section through a turbo engine according to the invention.

FIG. 2 shows a schematic excerpt from a turbo engine according to the invention in the region of a rotor 31 of a high-pressure turbine 32 as well as of a rotor 33 of a low-pressure turbine 34, wherein, according to FIG. 2, a flow channel 35 extends between high-pressure turbine 32 and low-pressure turbine 34 through which channel the flow that leaves high-pressure turbine 32 will be guided and introduced into low-pressure turbine 34. At least one support rib 36 that diverts the flow that flows through flow channel 35 is positioned in flow channel 35, wherein for this purpose support rib 36 comprises a front edge 37, which is also called a flow inlet edge, a rear edge 38, which is also called a flow outlet edge, a suction side 39 as well as a pressure side 40. A flow around suction side 39 of support rib 36 is visualized by arrow 41 in FIG. 2.

Figure 1:
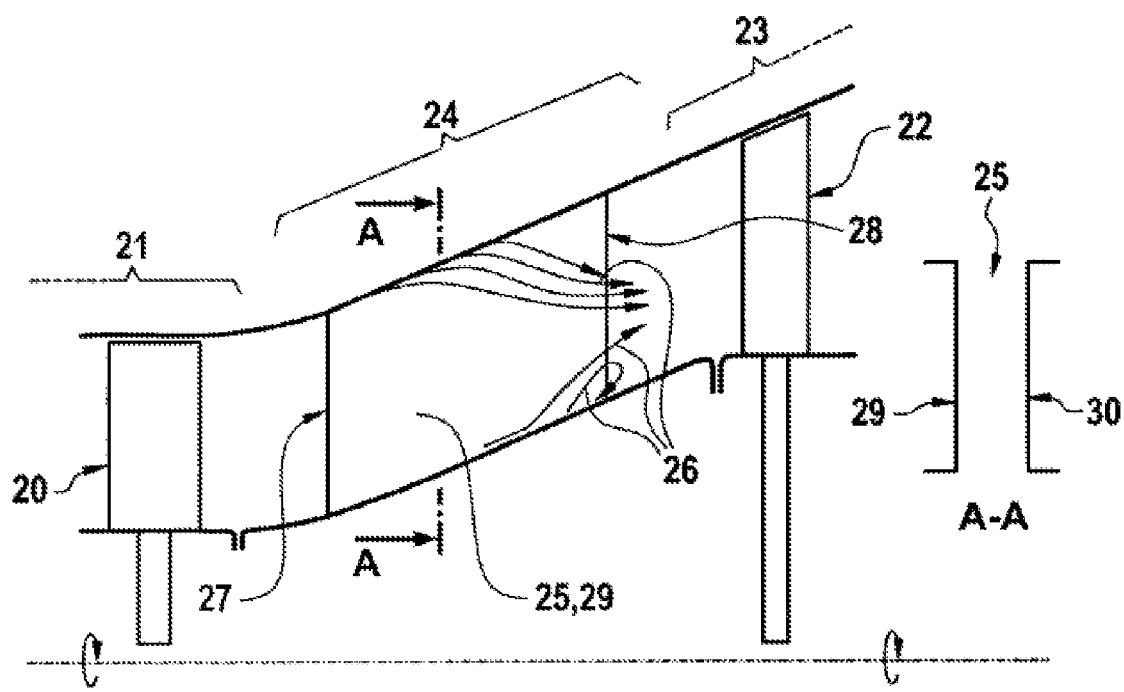
FIG. 1 shows a very schematic, excerpted longitudinal section through a turbo engine known from the prior art.

The present invention now relates here to details of support rib 36 or of each support rib 36 that is positioned in flow channel 35, and in fact, to those details by means of which flow losses in the region of flow channel 35 can be reduced. In FIG. 2, for clarification of the invention, in addition to support rib 36 designed according to the invention, the support rib 25, which is known from the prior art and shown in FIG. 1, is depicted by the dashed lines.

Figure 4:
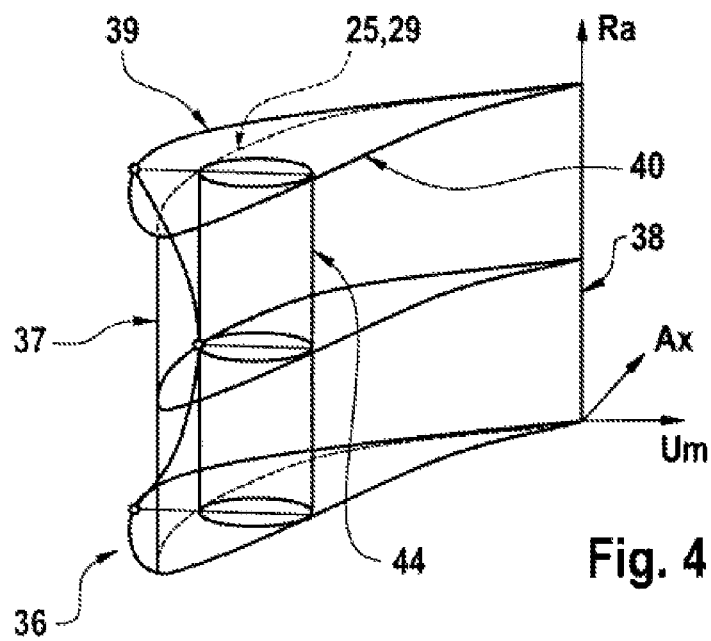
FIG. 4 shows a first intermediate design stage of a support rib for further clarification of the invention.

As can be particularly derived from section B-B of FIG. 2 as well as FIG. 4, suction side 39 of support rib 36 can be contoured such that, viewed in the radial direction Ra, a thickness of support rib 36 is enlarged or increases in the direction onto a radially inner boundary wall 42 as well as in the direction onto a radially outer boundary wall 43 of flow channel 35.

Thus, it can be derived from sectional view B-B through support rib 36 of FIG. 2 that support rib 36 is concavely curved in the region of suction side 39, wherein, proceeding from a middle section viewed in the radial direction Ra, the thickness of the rib continually increases in the direction onto the radially inner boundary wall 42 as well as in the direction onto the radially outer boundary wall 43.

In FIG. 4, in addition to radial direction Ra, the axial direction Ax and the circumferential direction Um are also shown. In addition, FIG. 4 shows that support rib 36 is designed as a hollow rib, in the inner space of which there extends in the radial direction Ra a preferably cylindrical guide element 44, by means of which, e.g., supply lines can be guided from radially inside to radially outside, as well as vice versa from radially outside to radially inside, by bridging flow channel 35.

The contouring of suction side 29 of support rib 25, which is known from the prior art, is shown by the dashed lines in FIG. 4, whereby it follows from FIG. 4 that by broadening the thickness of suction side 39, the inner space of support rib 36 that is available for uptake of guide element 44 is enlarged in principle.

Figure 5:
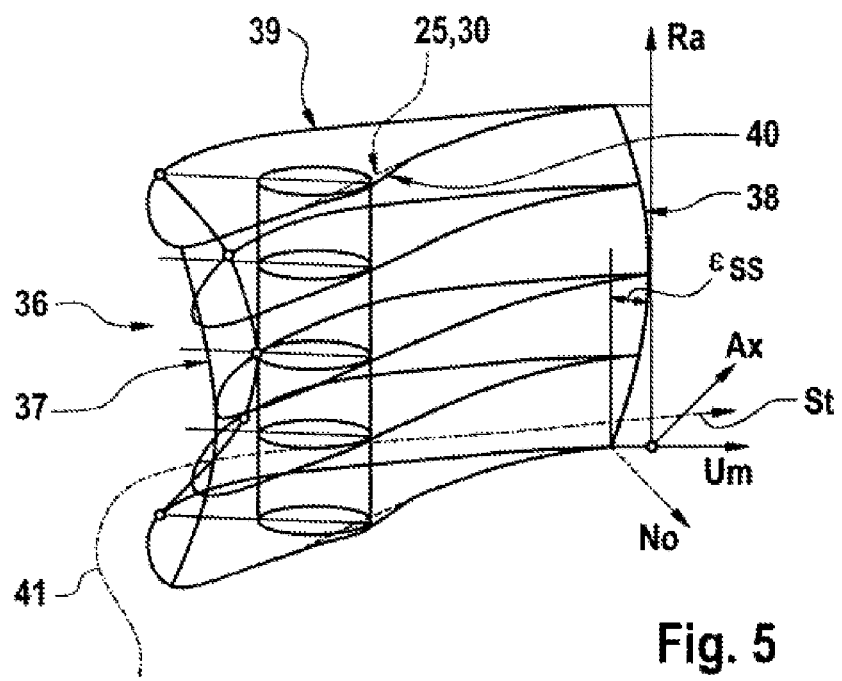
FIG. 5 shows a second intermediate design stage of a support rib for further clarification of the invention.

In the region of pressure side 40 of support rib 36, as can be derived from FIG. 5, the rib can be contoured such that, viewed in the radial direction Ra, the thickness of support rib 36 is enlarged or increases at least directly in the region of the radially inner boundary wall 42 as well as directly in the region of the radially outer boundary wall 43, whereby the inner space of support rib 36 that is available for the uptake of guide element 44 is also enlarged in the region of pressure side 40, so that it is then possible to incline rear edge 38 or the flow outlet edge of support rib 36 in the circumferential direction Um.

Accordingly, the thickness of the support rib is increased in the region of pressure side 40 in the direct vicinity of the radially inner boundary wall 42 of flow channel 35 as well as in the direct vicinity of the radially outer boundary wall 43 of flow channel 35.

In this way, it is then possible to displace radially outer sections as well as radially inner sections through support rib 36 in the circumferential direction, whereby the rear edge 38 as well as the front edge 37 of support rib 36 will then be inclined in the circumferential direction.

In FIG. 5, in addition to the radial direction Ra, the axial direction Ax and the circumferential direction Um, there is also found a flow direction St as well as a normal direction No for flow direction St, whereby an angle between the radially inner or hub-side boundary wall 42 of flow channel 35 and suction side 39 of support rib 36, viewed about the flow direction St, is characterized as $\epsilon_{SS}$ in the region of rear edge 38 in FIG. 5. This angle is also called the suction-side corner angle, whereby, by thickening the pressure side 40 of support rib 36 and by displacement of the radially outer and radially inner sections of the rib in the circumferential direction, this suction-side corner angle $\epsilon_{SS}$ can be enlarged. FIG. 5 shows the simplest case of a flow channel with cylindrical side walls.

FIG. 6 shows the case of a flow channel or annular space with rising side walls. Here, front edge 37 as well as rear edge 38 of support rib 36, as can be derived from FIG. 6, are inclined in the meridian direction Me. Thus, the meridian direction Me is additionally depicted in FIG. 6, whereby the inclination of rear edge 38 of support rib 36 in the meridian direction Me is visualized by the offset ΔMe in FIG. 6. The conventional type of structure is shown in FIG. 7 by the dashed lines for the front edge and the rear edge. Due to the inclination of front edge 37 and rear edge 38 in the meridian direction Me, the suction-side corner angle $\epsilon_{SS}$ can be enlarged once more, whereby the flow ratios can again be optimized. The suction-side corner angle $\epsilon_{SS}$ amounts to more than 80°, in particular more than 90°, in the region of rear edge 38 of support rib 36.

Despite the circumferential inclination described in connection with FIG. 5 and the meridian inclination described in connection with FIG. 6, now as before, support element 44 can be guided in radial direction Ra in the inside space of support rib 36.

According to an advantageous enhancement of the present invention here, the radially inner boundary wall 42 of flow channel 35 is bent radially inwardly, and the radially outer boundary wall 43 of flow channel 35 is bent radially outwardly, in such a way that a widening of flow channel 35 that is brought about by this contouring of boundary walls 42, 43 equilibrates an obstruction of flow channel 35 brought about by increasing the thickness of support rib 36 in the region of the suction side. In particular, this contouring of boundary walls 42, 43 additionally compensates for the obstruction of flow channel 35 caused by increasing the thickness of support rib 36 in the region of pressure side 40.

Figure 3:
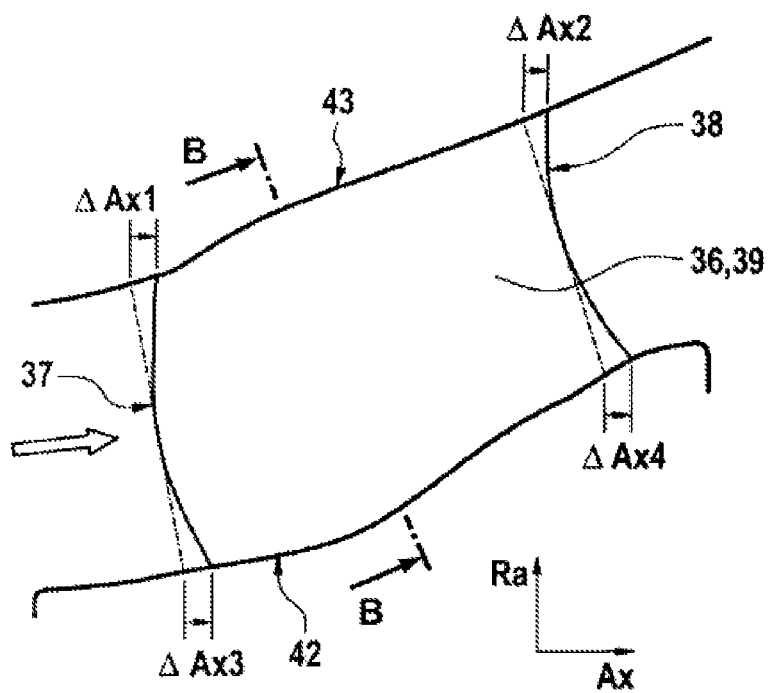
FIG. 3 shows an enlarged detail of FIG. 2.

This contouring of the radially inner boundary wall 42 of flow channel 35 which is bent radially inwardly and the contouring of the radially outer boundary wall 43 of flow channel 35 which is bent radially outwardly can be derived from FIGS. 2 and 3.

According to an advantageous enhancement of the present invention here, support rib 36 is contoured at front edge 37 or the flow inlet edge in such a way that in the direction onto the radially inner boundary wall 42 of flow channel 35 as well as in the direction onto the radially outer boundary wall 43 of flow channel 35, front edge 37 has a back sweep, i.e., front edge 37 is displaced downstream in the flow direction, viewed in this direction. The offset of front edge 37 in the region of the radially outer boundary wall 43 is characterized by the dimension ΔAx1 in FIG. 3. The offset of front edge 37 in the region of the radially inner boundary wall 42 is characterized by ΔAx3 in FIG. 3. These two offsets may be of equal magnitude or may also be of different magnitude.

Likewise, according to FIG. 3, support rib 36 is contoured in the region of rear edge 38 with a back sweep, and in fact both in the direction onto the radially inner boundary wall 42 as well as in the direction onto the radially outer boundary wall 43, rear edge 38 has a back sweep and accordingly, it is displaced downstream viewed in the flow direction. The offset of rear edge 38 in the region of the radially outer boundary wall 43 is characterized by the dimension ΔAx2 in FIG. 3; the dimension ΔAx4 characterizes the offset of rear edge 38 in the region of the radially inner boundary wall 42. These two offsets may be of equal magnitude or may also be of different magnitude.

Further preferred details of the turbo engine according to the invention, i.e., details for the configuration of support rib 36, can be taken from FIGS. 9 to 12. Thus the relative height of flow channel 35 is plotted on the vertically running axis in FIGS. 9 to 12. The radially inner boundary wall 42 of the flow channel lies accordingly at the relative height 0 of the flow channel, while the radially outer boundary wall 43 lies at the relative height 1 thereof.

Figure 9:
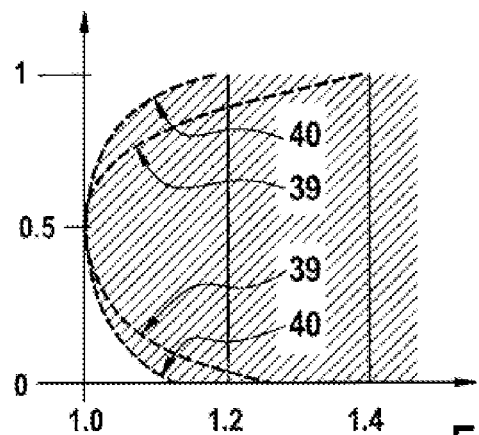
FIG. 9 shows a first diagram for further clarification of the invention.

In FIG. 9, a relative thickness of support rib 36 in the region of suction side 39 or in the region of pressure side 40 is plotted on the horizontally running axis, and in fact, in such a way that the relative thickness amounts to 1 in the region of a center cut through support rib 36.

Proceeding from this center cut, which lies at a relative height of the flow channel of approximately 0.5, the relative thickness of support rib 36 increases in the region of suction side 39 and in the region of pressure side 40. In this way, FIG. 9 shows that support rib 36 has the greatest relative thickness increase of approximately 40% in the region of the radially outer side wall as well as in the region of suction side 39. In the region of the radially inner boundary wall, the relative thickness increase on suction side 39 amounts to approximately 25% according to FIG. 9. In the region of the radially outer boundary wall of flow channel 35, the relative thickness increase of pressure side 40 amounts to approximately 10% according to FIG. 9; in the region of the radially inner boundary wall, this relative thickness increase of pressure side 40 amounts to approximately 5%.

Figure 10:
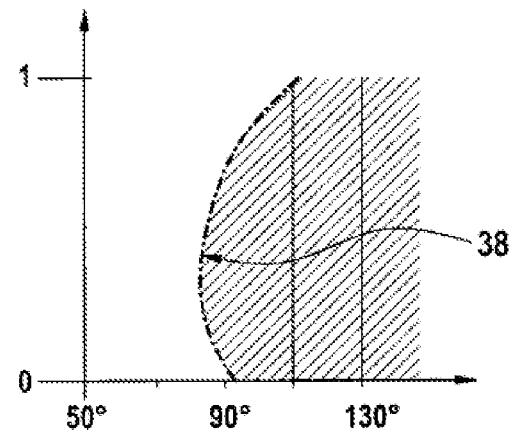
FIG. 10 shows a second diagram for further clarification of the invention.

In FIG. 10, the suction-side corner angle in the region of rear edge 38 of support rib 36 is plotted on the horizontally running axis, whereby, as can be taken from FIG. 10, the suction-side corner angle of rear edge 38 in the region of the radially inner boundary wall 42 of flow channel 35 amounts to approximately 90° and in the region of the radially outer boundary wall 43 of flow channel 35, it amounts to approximately 110°. Viewed over the entire rear edge 38, the suction-side corner angle is always greater than 80°.

Figure 11:
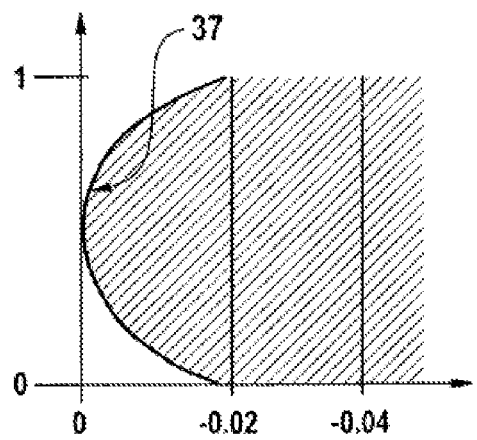
FIG. 11 shows a third diagram for further clarification of the invention.
Figure 12:
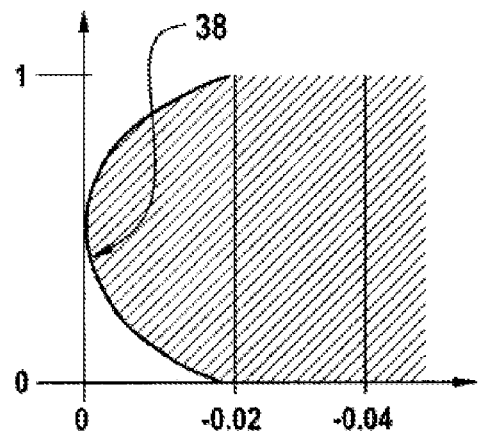
FIG. 12 shows a fourth diagram for further clarification of the invention.

In FIGS. 11 and 12, a downstream offset of front edge 37 or rear edge 38 referred to the axial dimension of support rib 36 is plotted on the horizontally running axis, whereby, as can be taken from FIGS. 11 and 12, both in the region of front edge 37 as well as in the region of rear edge 38, the downstream offset referred to the axial dimension of support rib 36 both in the region of the radially inner boundary wall 42 as well as also in the region of the radially outer boundary wall 43 amounts to more than 1%, preferably approximately 2%.

Due to the special design of support rib 36, which is positioned in flow channel 35 between two turbines, flow losses can be considerably reduced.

Both the flow around support ribs 36 and the flow of a row of vanes in turbine 34 positioned downstream of support ribs 36, viewed in the flow direction, are improved in this way.

The invention claimed is:

1. A turbo engine, in particular a gas turbine aircraft engine, having a plurality of compressor components, at least one combustion chamber and a plurality of turbine components, wherein at least one support rib is positioned in a flow channel between two turbine components connected one behind the other, wherein the support rib or each support rib has a suction side, a pressure side, a front edge and a rear edge, wherein the support rib or each support rib diverts a flow that flows through the flow channel, and wherein a guide element runs in an inside space of the support rib or of each support rib,
is hereby characterized in that
a) the suction side (39) of support rib (36) or of each support rib (36) is contoured in such a way that, viewed in the radial direction, a thickness of the respective support rib (36) is enlarged or increases in the direction onto a radially inner boundary wall (42) of flow channel (35) as well as in the direction onto a radially outer boundary wall (43) of flow channel (35);
b) the pressure side (40) of support rib (36) or of each support rib (36) is contoured in such a way that, viewed in the radial direction, the thickness of the respective support rib (36) is enlarged or increases at least directly in the region of the radially inner boundary wall (42) of flow channel (35) as well as directly in the region of the radially outer boundary wall (43) of flow channel (35);
c) the front edge (37) and the rear edge (38) of support rib (36) or of each support rib (36) are inclined in the meridian direction;
further characterized in that
the radially inner boundary wall (42) of the flow channel is bent radially inwardly, and the radially outer boundary wall (43) of the flow channel is bent radially outwardly in such a way that a widening of flow channel (35) brought about by this contouring of the boundary walls equilibrates an obstruction of flow channel (35) brought about by widening the support rib in the region of suction side (39).

2. The turbo engine according to claim 1,
further characterized in that
support rib (36) or each support rib (36) is concavely curved in the radial direction on the suction side (39) thereof.

3. The turbo engine according to claim 1,
further characterized in that
the widening of flow channel (35) brought about by this contouring of boundary walls (42, 43) additionally equilibrates the obstruction of flow channel (35) brought about by the widening of support rib (36) in the region of pressure side (40).

4. The turbo engine according to claim 1,
further characterized in that
support rib (36) or each support rib (36) is contoured on front edge (37) in such a way that in the direction onto the radially inner boundary wall (42) of the flow channel as well as in the direction onto the radially outer boundary wall (43) of the flow channel, front edge (37) has a back sweep, and thus is displaced downstream when viewed in the flow direction.

5. The turbo engine according to claim 4,
further characterized in that
directly in the region of the inner boundary wall as well as directly in the region of the radially outer boundary wall, front edge (37) is displaced downstream in such a way that the ratio between the downstream offset and the axial dimension of the support rib amounts to more than 1%.

6. The turbo engine according to claim 1,
further characterized in that
support rib (36) or each support rib (36) is contoured on rear edge (38) in such a way that in the direction onto the radially inner boundary wall (42) of the flow channel as well as in the direction onto the radially outer boundary wall (43) of the flow channel, rear edge (38) has a back sweep, and thus is displaced downstream when viewed in the flow direction.

7. The turbo engine according to claim 6,
further characterized in that
directly in the region of the inner boundary wall as well as directly in the region of the radially outer boundary wall, rear edge (38) is displaced downstream in such a way that the ratio between the downstream offset and the axial dimension of the support rib amounts to more than 1%.

8. The turbo engine according to claim 1,
further characterized in that
support rib (36) or each support rib (36) is contoured on rear edge (38) in such a way that it encloses a suction-side corner angle greater than 80° on a radially inner end with radially inner boundary wall (42) of the flow channel and on a radially outer end with radially outer boundary wall (43) of the flow channel.

9. The turbo engine according to claim 1, further characterized in that
the flow-diverting support rib (36) or each support rib (36) is contoured on a rear edge (38) or flow outlet edge in such a way that rear edge (38) is additionally inclined in the circumferential direction.

\* \* \* \* \*